(12) United States Patent
Yebka et al.

(10) Patent No.: US 12,253,737 B2
(45) Date of Patent: Mar. 18, 2025

(54) DEVICE AND METHOD FOR PROVIDING PRIVACY FOR AN ELECTRONIC DEVICE

(71) Applicant: LENOVO (SINGAPORE) PTE. LTD, New Tech Park (SG)

(72) Inventors: Bouziane Yebka, Apex, NC (US); Tin-Lup Wong, Chapel Hill, NC (US); Philip J. Jakes, Durham, NC (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 477 days.

(21) Appl. No.: 17/656,749

(22) Filed: Mar. 28, 2022

(65) Prior Publication Data
US 2023/0314754 A1    Oct. 5, 2023

(51) Int. Cl.
*G02B 7/04*    (2021.01)
*G09G 3/00*    (2006.01)

(52) U.S. Cl.
CPC ............... *G02B 7/04* (2013.01); *G09G 3/001* (2013.01); *G09G 2354/00* (2013.01); *G09G 2358/00* (2013.01)

(58) Field of Classification Search
CPC ...... G02B 7/04; G09G 3/001; G09G 2354/00; G09G 2358/00; G09G 2320/068
USPC .......................................................... 359/823
See application file for complete search history.

(56) References Cited

U.S. PATENT DOCUMENTS

| | | | | |
|---|---|---|---|---|
| 2013/0016130 A1* | 1/2013 | Singaraju | ............... | H04R 1/403 345/204 |
| 2015/0228226 A1* | 8/2015 | Luebke | ............. | G02F 1/133606 345/102 |
| 2018/0025702 A1* | 1/2018 | Aurongzeb | .......... | G09G 3/3406 345/589 |
| 2019/0179074 A1* | 6/2019 | Choi | ....................... | G02B 6/005 |
| 2020/0409137 A1* | 12/2020 | Clarke | .................... | G09G 3/002 |
| 2021/0191145 A1* | 6/2021 | Schrama | .................. | G09G 3/32 |

* cited by examiner

*Primary Examiner* — William R Alexander
(74) *Attorney, Agent, or Firm* — Dean D. Small; The Small Patent Law Group, LLC

(57) ABSTRACT

An electronic device is provided that includes a layered screen configured to present an image. The electronic device includes a memory to store executable instructions, and one or more processors. When implementing the executable instructions the one or more processors are configured to generate the image at a determined distance and location from the screen at a convergence focal location. The image is in focus at the convergence focal location and out of focus elsewhere.

20 Claims, 7 Drawing Sheets

DEVICE AND METHOD FOR PROVIDING PRIVACY FOR AN ELECTRONIC DEVICE

BACKGROUND

Embodiments herein generally relate to devices and methods for providing privacy when using an electronic device.

Electronic devices, such as laptop computers, mobile phones, personal digital assistants (PDAs), iPads, other computing devices, etc. have become part of many individuals' everyday life. Such electronic devices continue to be improved to make the experience of user as enjoyable as possible.

Still, with increased use of electronic devices in public environments where numerous individuals are located, often privacy related to the electronic device can be compromised. For example, when using a laptop computer when flying on an airplane, often the individuals to either side or behind the user can observe the screen of the user. As a result, complete strangers are able to see private pictures, messages, or the like of the individual. In other instances, a user may be working on a document, drawing, etc. that is confidential to an employer, client, or the like that is not to be shared with third parties.

Similarly, with many individuals no longer working from an office building and instead working from home, often individuals will go to a coffee shop, restaurant, or other public place to work. Again, in these public environments, anyone in the environment may look over an individual's shoulder, or see the screen of an electronic device. Thus, again, privacy issues are presented.

Currently, some electronic devices include privacy filters that reduce the viewing area from the screen to only 60° (e.g. 30° on either side of the middle of the screen). Such filters prevent individuals on the side of a user from being able to view the screen. Still, anyone behind the user and within the 60° space is still able to view the screen, resulting in unwanted viewing of a screen.

SUMMARY

In accordance with embodiments herein, an electronic device is provided that includes a layered screen configured to present an image. The electronic device includes a memory to store executable instructions, and one or more processors. When implementing the executable instructions the one or more processors are configured to generate the image at a determined distance and location from the screen at a convergence focal location. The image is in focus at the convergence focal location and out of focus elsewhere.

Optionally, the layered screen includes a lens assembly having a first lens and a second lens that is movable in relation to the first lens to move the convergence focal location with respect to the layered screen. In one aspect, the electronic device also includes an actuating device configured to move the first lens with respect to the second lens. In another aspect, the layered screen also includes an anti-glare coating, ultra-violet (UV) hard coating, and a protective film.

Optionally, the layered screen includes a lens assembly having a first lens, and the electronic device additionally has an actuating device configured to vary at least one optical property of the first lens. In one aspect, the convergence focal location is at a single viewing area. In another aspect, the electronic device also includes a keyboard coupled to the layered screen. In one example, the electronic device also includes a sensor coupled to the one or more processors. The one or more processors can also implement the instructions to obtain user characteristics of a user from the sensor, determine an identification of the user based on the user characteristics, and generate the image at the determined distance and location from the screen at the convergence focal location based on the identification of the user. In another example the electronic device includes a sensor coupled to the one or more processors. In addition, the one or more processors can also implement the instructions to obtain environmental characteristics in an environment from the sensor, and generate the image at the determined distance and location from the screen at the convergence focal location based on the environmental characteristics. Optionally, the environmental characteristics include at least one of an individual in the environment who in not the user, sounds in the environment, or a location of the environment. In one embodiment, the electronic device is a laptop computer.

In accordance with embodiments herein, a method is provided under control of one or more processors including program instructions to project an image through a lens assembly within a layered screen of an electronic device to focus the image at a determined distance and location from the screen at a convergence focal location. The image projected is out of focus at locations other than the convergence focal location.

Optionally, the one or more processors include instructions to obtain user characteristics from at least one sensor, and identify a user of the electronic device based on the user characteristics. The one or more processors may also include instructions to obtain a user profile based on the user identified, and project the image through the lens assembly to focus the image at the determined distance and location from the screen at the convergence focal location based on the user profile. In one aspect, the one or more processors also include instructions to obtain environmental characteristics from at least one sensor, and project the image through the lens assembly to focus the image at the determined distance and location from the screen at the convergence focal location based on the environmental characteristics. In one example, the one or more processors further include instructions to obtain environmental characteristics from at least one sensor, determine the location of the electronic device based on the environmental characteristics, and project the image through the lens assembly to focus the image at the determined distance and location from the screen at the convergence focal location based on the location determined. In another example, the one or more processors further include instructions to obtain user characteristics from at least one sensor, determine a location of the user with respect to the layered screen based on the user characteristics, and automatically actuate an actuation device to move a first lens of the lens assembly relative to a second lens, or to change an optical property of the first lens, to move the convergence focal location in response to determining the location of the user with respect to the layered screen.

In accordance with embodiments herein, a computer program product comprising a non-signal computer readable storage medium is provided that comprises computer executable code to automatically obtain, with a sensor of an electronic device, user characteristics or environmental characteristics in an environment. The computer executable code can also determine whether to impair an image on a screen of the electronic device based on the user characteristics or environmental characteristics, and generate the image at a determined distance and location from the screen at a convergence focal location such that the image is in focus at the convergence focal location and out of focus elsewhere to impair the image on the screen.

Optionally, the computer executable code also actuates an actuation device of the electronic device to vary a location of the convergence focal location. In one aspect to determine whether to impair the image on the screen of the electronic device includes identifying a user based on the user characteristics, and accessing a profile that indicates when or where to impair the image. In another aspect, the environmental characteristics include a location of the electronic device.

DETAILED DESCRIPTION

Figure 1:
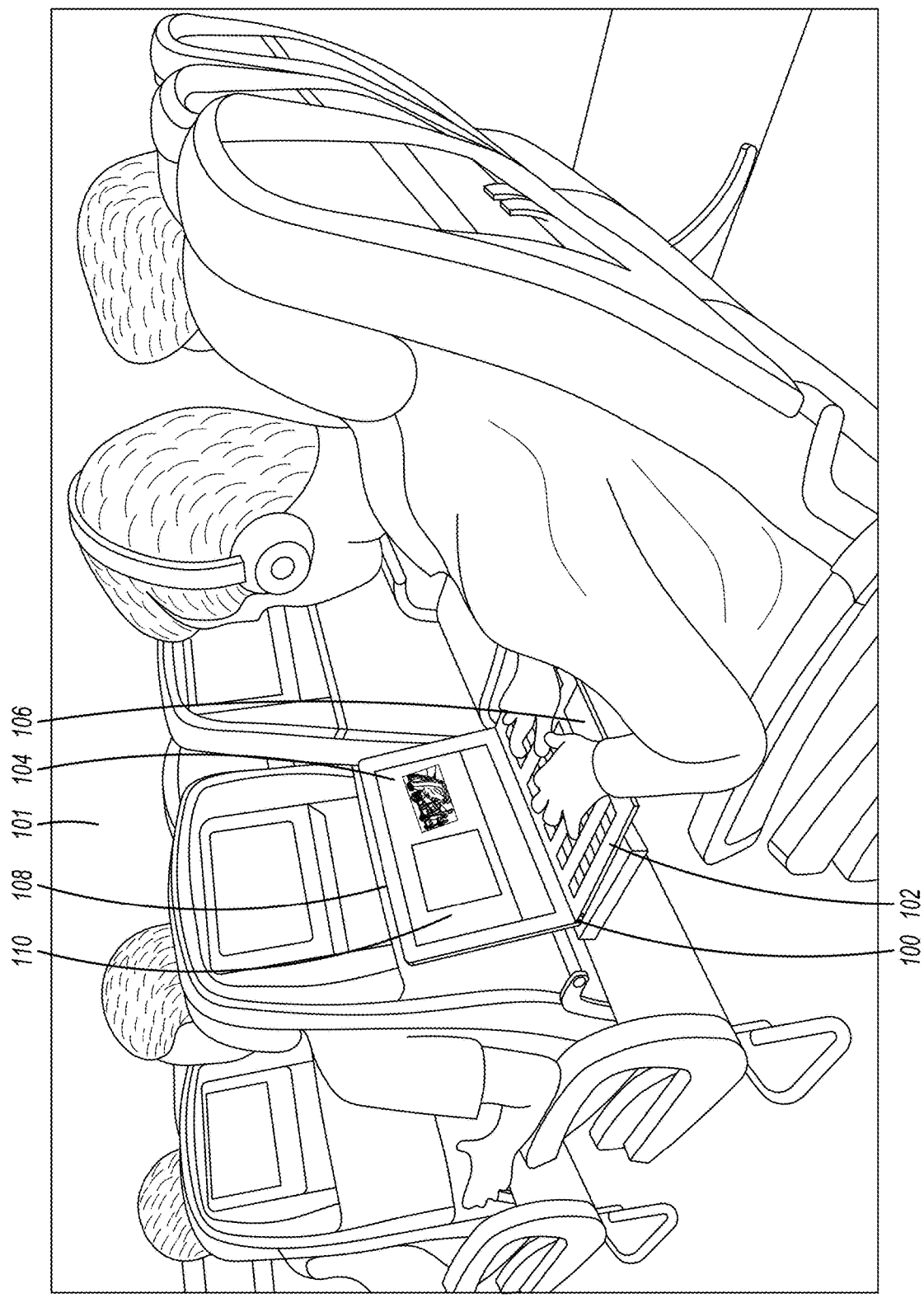
FIG. 1 illustrates a back perspective view of an electronic device in an environment, in accordance with the embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The phrase "convergence focal location" shall mean a location at which light waves used to form an image meet after reflection, refraction, direction, redirection, etc. The light waves may emit from a source, such as an electronic device and pass through a layered screen. In one example, the layered screen can include a lens assembly having at least two lens where at least one can move relative to the other to cause the reflection, refraction, direction, redirections, etc. When an individual is at the convergence focal location the light waves come together, or converge to produce a focused image. When moving either towards or away from the convergence focal location the image becomes out of focus because the light waves do not converge at such other locations. Instead an image is impaired for an individual attempting to clearly see the image and is out of focus, or appears blurry.

The phrase "user characteristic" and "user characteristics" shall mean any and all features, qualities, etc. of a user of an electronic device. User characteristics may be obtained by being inputted into an electronic device, communicated by another electronic device, detected by a sensor, determined by a processor, or the like. Example user characteristics may include user identification, user facial features, biometric data and information related to the user, user location, user distance from the screen, personal information input into an electronic device by a user or other, fingerprint, retinal data or information, voice qualities including pitch, tone, accent, volume, etc., login information, user passwords, or the like.

The phrase "environmental characteristic" and "environmental characteristics" shall mean any and all features, qualities, etc. of an environment of an electronic device. Environmental characteristics can be obtained by being inputted into an electronic device, communicated by another electronic device, detected by a sensor, determined by a processor, or the like. Example environmental characteristics include temperatures, noise levels, light levels, landmarks, geolocations, latitude and longitude, other individuals or electronic devices in an environment, or the like.

The term "environment" shall mean, and refer to a physical region in which one or more electronic devices are located and in which an image on a screen of the electronic device is perceived (e.g., seen) by individuals. By way of example, an environment may refer to one or more rooms within a home, office or other structure. An environment may or may not have physical boundaries. For example, an environment instead be defined based upon a range over which individuals may perceive images provided by an electronic device. When an electronic device is portable and/or handheld, an environment associated with the electronic device may shift over time when the electronic device is moved. For example, an environment surrounding a smart phone, tablet device or laptop computer moves with the smartphone, tablet device or laptop computer. An environment surrounding a electronic device will shift each time the electronic device is relocated, such as when moved between different rooms of a home, office building or other residential or commercial structure.

The phrase "layered screen" shall mean any display, screen, or the like formed of multiple components, layers, coatings, etc. Such components, layers, coatings, etc. may include anti-glare coatings, ultra-violet (UV) hard coating, films, anti-glare films, protective films, lens assemblies, lenses, or the like.

The term "obtains" and "obtaining", as used in connection with data, signals, information and the like, include at least one of i) accessing memory of an external device or remote server where the data, signals, information, etc. are stored, ii) receiving the data, signals, information, etc. over a wireless communications link between the base device and a secondary device, and/or iii) receiving the data, signals, information, etc. at a remote server over a network connection. The obtaining operation, when from the perspective of a base device, may include sensing new signals in real time, and/or accessing memory to read stored data, signals, information, etc. from memory within the base device. The obtaining operation, when from the perspective of a secondary device, includes receiving the data, signals, information, etc. at a transceiver of the secondary device where the data, signals, information, etc. are transmitted from a base device and/or a remote server. The obtaining operation may be from the perspective of a remote server, such as when receiving the data, signals, information, etc. at a network interface from a local external device and/or directly from a base device. The remote server may also obtain the data, signals, information, etc. from local memory and/or from other memory, such as within a cloud storage environment and/or from the memory of a personal computer.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

An electronic device and methods are provided for preventing individuals in an environment from being able to obtain information from an image on a screen of the electronic device. Instead of presenting the image on the screen at the plane of the screen, the electric device provides the image at a convergence focal location that is a determined distance from the screen. The electronic device can accomplish presenting the image at the convergence focal point by projecting the image at a convergence focal location, or by providing a lens assembly that projects the image to the convergence focal location. When utilizing the lens assembly, lenses of the lens assembly can be moved in relation to one another to move the convergence focal point towards or away from the screen. At the convergence focal location the image on the screen is viewed in focus, whereas movement towards or away from the convergence focal location causes the screen to appear out of focus, and blurry, impairing the ability of an individual from clearly seeing the image and determining information when viewing the screen.

Figure 2:
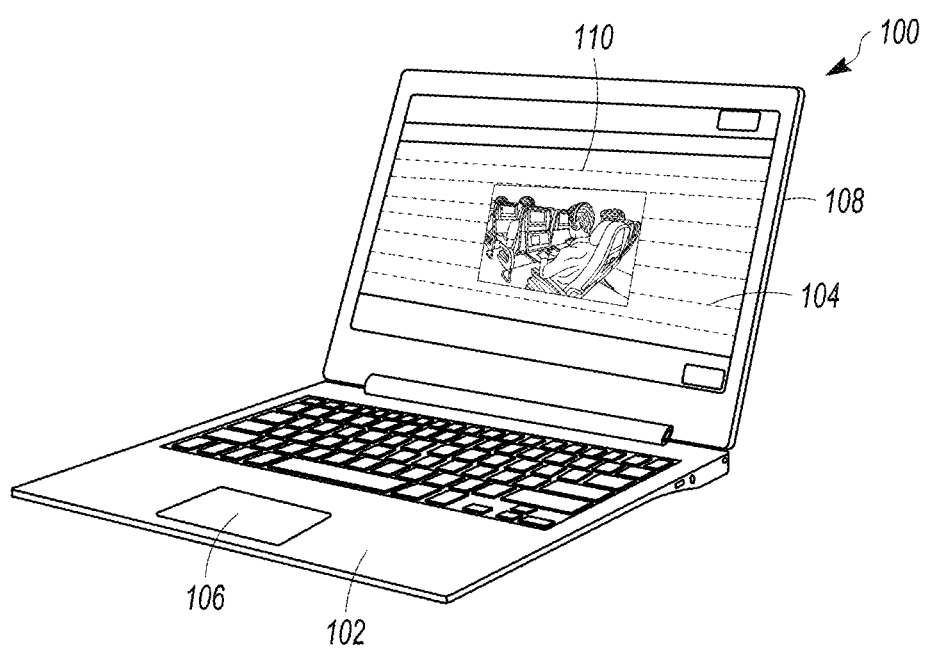
FIG. 2 illustrates a front perspective view of an electronic device, in accordance with embodiments herein.

FIGS. 1 and 2 illustrate an example electronic device 100 that is a laptop computer. While illustrated as a laptop, in other example embodiments the electronic device may be a smart phone, iPad, tablet, portable electronic device, or the like. As illustrated in FIG. 1, the electronic device may be portable such that the electronic device may be within an environment 101 where other individuals may be located. In the example of FIG. 1, the environment is the interior of an airplane where other individuals may be seated beside or behind the user of the laptop. In addition, another individual could be in a walkway. In each instance, the other individual is in a location in which they may view the electronic device 100 while an individual uses the electronic device 100. While illustrated as within an airplane, the environment may include a coffee shop, restaurant, library, college dorm or study area, classroom, stadium, park, doctor's office, waiting area, airport, or the like.

With reference back to both FIGS. 1 and 2, the electronic device includes a keyboard 102 that is hingedly coupled to a display 104. An input device 106 such as a mouse is coupled either through a cord, such as a USB cord, or wirelessly. In other examples, the keyboard 102 may include a touch pad (FIGS. 1 and 2) that functions as a mouse. The display 104 can include a frame 108, or area, that forms a border around a screen 110.

In one example, the screen 110 may be formed from layered materials (FIG. 3) that include lenses (FIG. 4) that converge the image on the screen to a determined distance and location in front of the screen 110 at a convergence focal location. As used here, image relates to any matter, document, word, text, picture, drawing, website, data, information, or the like provided on the screen 110 for viewing by the user. In one example, the lenses may move relative to one another such that the determined distance of the convergence focal location may be moved towards or away from the screen 110 to allow the user to adjust the screen to the distance of the user. By converging the image at a determined distance and location, only a user at that exact distance and location will be able to clearly view of image on the screen. Meanwhile, those to the side, or behind the user will view the image after convergence, or during divergence resulting in a blurry image. To this end, the further away from the determined convergence focal location, the blurrier, and unfocused the image becomes. Therefore, the lenses work to filter the image on the screen such that only the user can clearly see the image.

Figure 3:
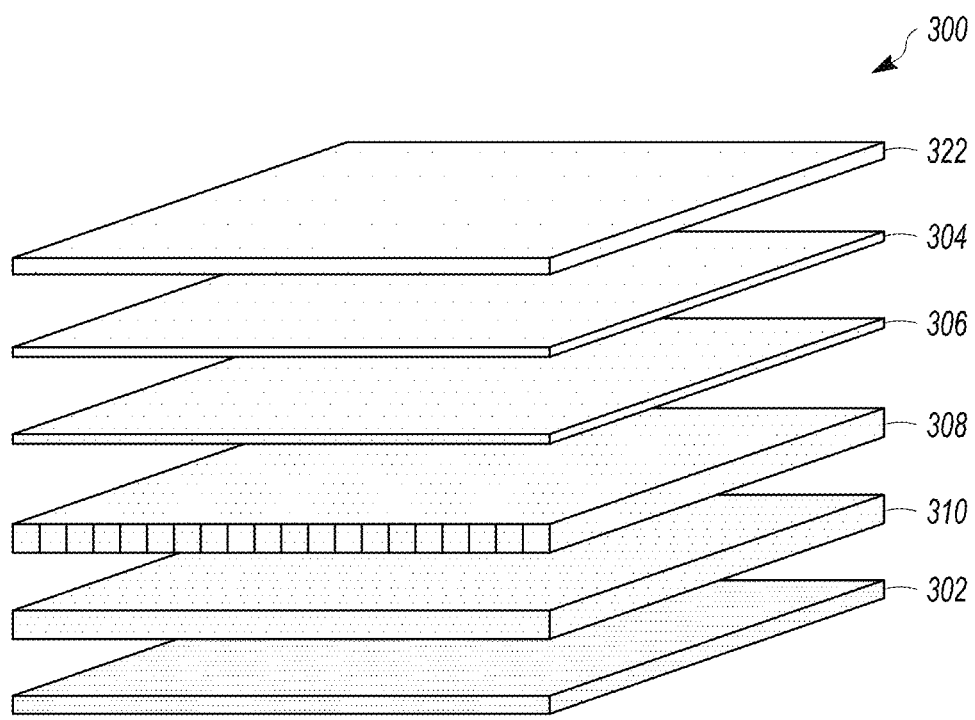
FIG. 3 illustrates a schematic diagram of a screen of an electronic device, in accordance with embodiments herein.

FIG. 3 illustrates an example layered screen 300 that may be utilized to filter an image on the screen to prevent individuals in an environment other than a user to clearly view the image provided on the screen. The layered screen may include a first liner 302 that may be a non-adhesive and receive the other layers. The first liner 302 may be the liner facing the user, and that can be touched by the user.

The layered screen 300 may also include an anti-glare coating 304 and ultra-violet (UV) hard coating 306. In example embodiments, the anti-glare coating 304 may be formed as an anti-glare film, and may be made of a polycarbonate material, acrylic material, glass material, or the like. Similarly, the UV hard coating 306 may be a film and can be made of a polyurethane material, acrylic materials, or the like. The layered screen also can include a protective film 308, that in one example may be a polyester film.

Figure 4:
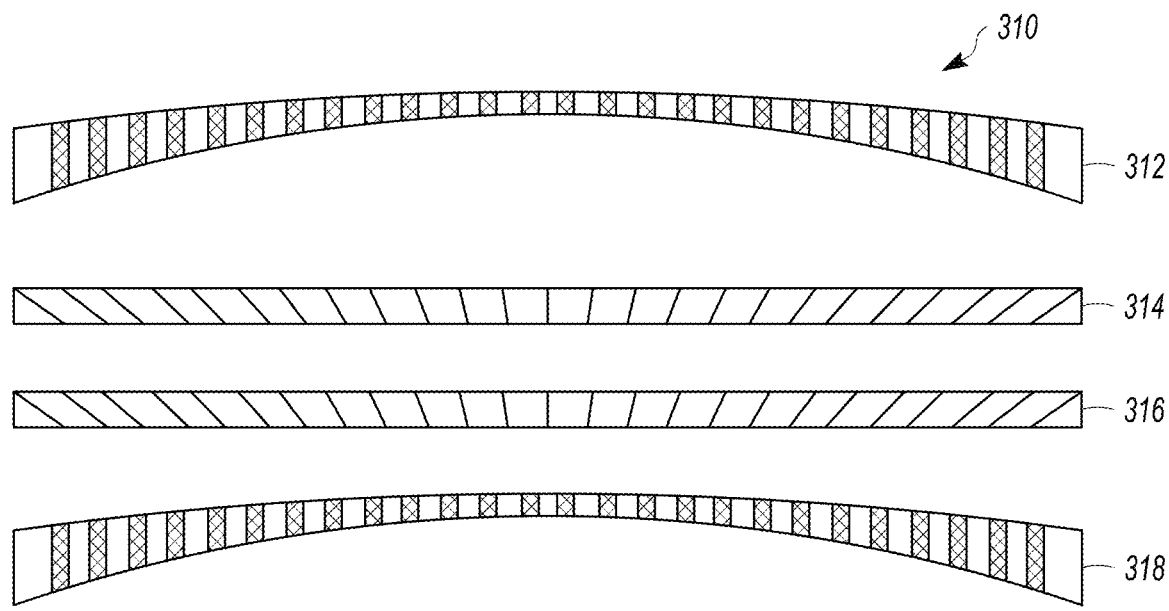
FIG. 4 illustrates a schematic diagram of a lens assembly, in accordance with embodiments herein.

The layered screen 300 may also include a lens assembly 310. The lens assembly 310 may include two or more lens configured to transmit an image to a convergence focal location at a determined distance and location spaced from the layered screen. In one example, as illustrated in FIG. 4, the lens assembly 310 may include a first plano concave lens 312, a first convex lens 314, a second convex lens 316, and a second plano concave lens 318. In other examples, other combinations of concave, convex, plano concave, or the like lenses may be utilized, as long as an image on the layered screen converges at a determined distance and location from the screen assembly as a result of passing through the lens assembly.

In an example, at least one of the lenses of the lens assembly 310 may be coupled to an actuating device. The actuating device may be a mechanical device, electrical device, ionizing device, or the like that either changes the distance between at least on of the lenses and another lens or changes the optical properties of at least one of the lenses of the lens assembly 310. By moving or changing the properties of a lens, the determined distance from the screen for convergence of the convergence focal location, and thus the focused image may be adjusted. By adjusting the convergence focal location of the focused image, a user may be located at different distances from the screen and still see the focused image. For example, when using an electronic device when sitting at a desk compared to sitting in a seat on an airplane, or sitting on a couch with the electronic device in your lap may present different distances and locations between the screen and the eyes of a user. Thus, by providing the actuation device the convergence focal location may be varied to address the different distances. In one example, the electronic device may include a memory with an image privacy application that includes a profile of a user and the different convergence focal locations, and lens assembly settings. In this manner, the distance can be easily varied by accessing of the profile. Alternatively, a sensor may be provided that detects, determines, identifies, etc. the distance from the screen to the eyes of the user and to automatically adjust the lens assembly 310 such that the convergence focal location occurs at the eyes of the user.

With reference back to FIG. 3, the layered screen 300 also includes a second liner 322. The second liner 322 is received within the frame of an electronic device and engage the electronic device when the electronic device is in an open position. Thus, the anti-glare coating 304, UV hard coating 306, protective film 308, and lens assembly 310 are all disposed between the first liner 302 and second liner 322 to form the layered screen 300.

Figure 5:
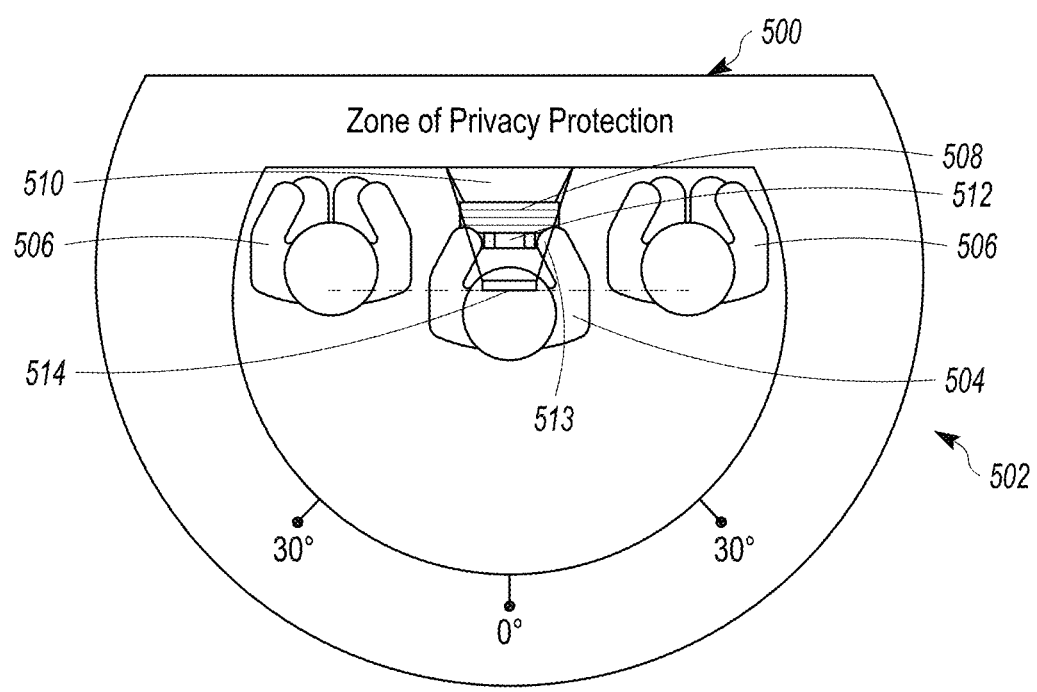
FIG. 5 illustrates a schematic diagram of an electronic device, in accordance with embodiments herein.

FIG. 5 illustrates an alternative embodiment of an electronic device 500 that filters displayed images in an environment 502 including by providing a conical viewing area 513. In example embodiments the environment 502 may be a library, restaurant, mall, airport, airplane, train, ferry, trolley, coffee shop, internet café, or the like. In the environment, the user 504 views the electronic device 500 while other individuals 506 are in the environment. A conical viewing area 513 is an area in which a focused image appears for anyone viewing a display 510. Outside of the conical viewing area 513, any images on the display will appear blurry or unfocused.

The electronic device 500 may include a keyboard 508 coupled to a display 510, and an auxiliary input device 512 such as a mouse pad similar to the example embodiments of FIGS. 1-2. In this example embodiment, instead of utilizing a lens assembly, the electronic device 500 includes a screen filtering application that includes instructions to generate a conical viewing zone 513. Within the conical viewing zone 513 the screen appears in focus for the user 504. Meanwhile for other individuals 506 outside of that zone, the image appears to not be in focus. In one embodiment, the screen filtering application can include a convergence focal location 514 that is at an area at a determined distance from the screen that a user may clearly view the display 510.

Consequently, when the conical viewing zone 513 is provided the user can position themselves within the conical viewing zone 513 (e.g. to be at the convergence focal location 514) to clearly see the display 510. Similarly, the user 504 may position themselves at the convergence focal location 514 (e.g. single viewing area) to view the display 510 while individuals that are not positioned at the convergence focal location 514 view a blurred version of the screen such that obtaining viewing information is impaired. As used herein impairment is used to convey that information and/or data provided in an image is more difficult to see or understand as a result of being blurry, or not in focus.

Figure 6:
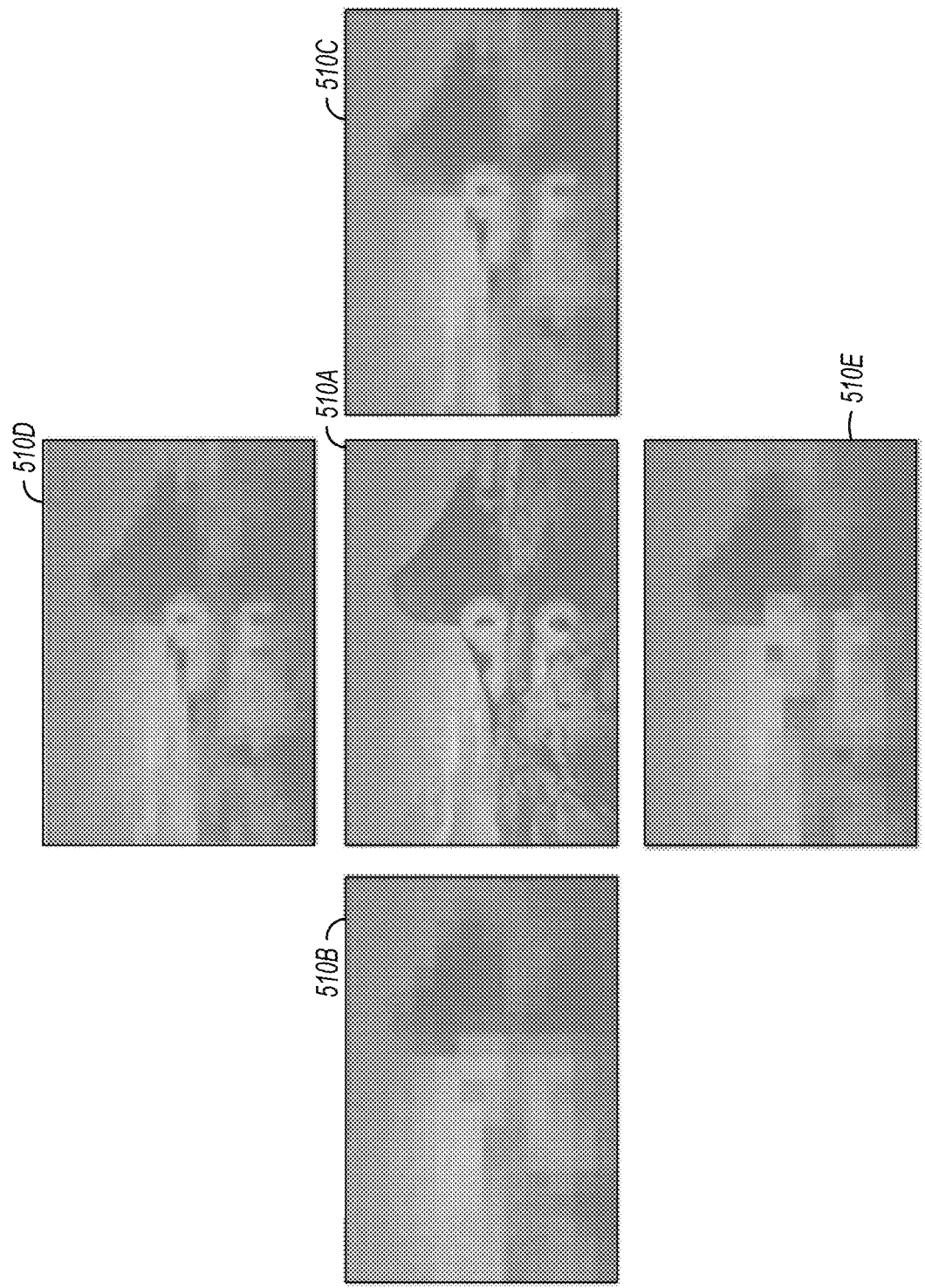
FIG. 6 illustrates displays of an electronic device, in accordance with the embodiments herein.

FIG. 6 illustrates how the display 510A-E of the electronic device of FIG. 5 appears at different viewing locations when a filtering application provides an image at a convergence focal location 514 within a conical viewing zone, or at a single viewing area. The display 510A represents the view of a user 504 that is at the convergence focal location 514 resulting in a clear image. The display 510B represents the view of another individual 506 sitting to the left of the user 504, while display 510C represents the view of another individual 506 sitting to the right of the user 504. Display 510D represents the view of another individual 506 behind the left shoulder of the user 504, while display 510E represents the view of another individual 506 behind the right shoulder of the user 504. As is illustrated, by providing a convergence focal location 514 within a conical viewing area, or at a single viewing area, the display 510 cannot be clearly observed by any other individual other than the user 504 located at that point. So, even individuals behind the user 504 only observe a blurred image from the screen, impairing the gathering of information from the display 510 accordingly.

Figure 7:
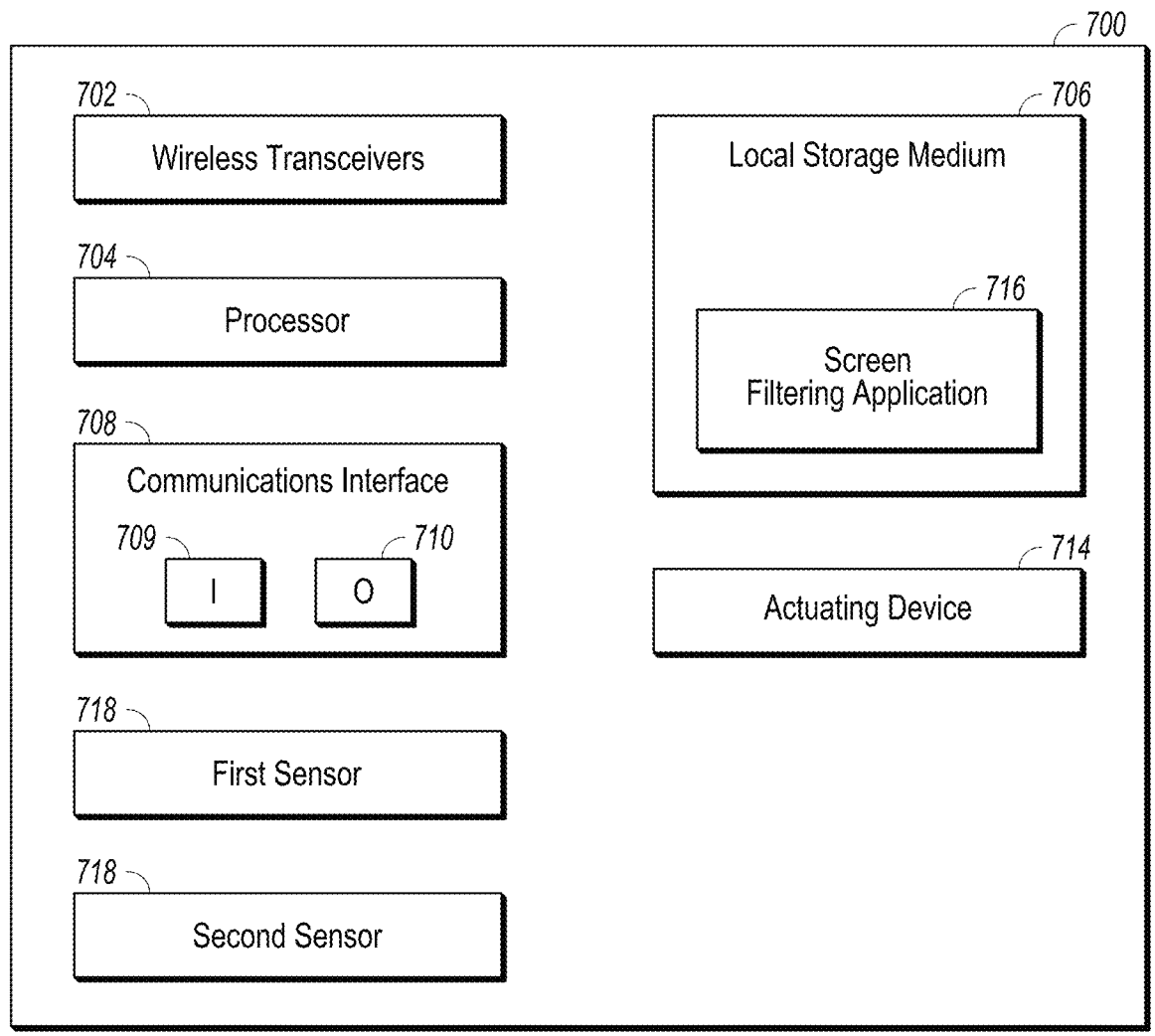
FIG. 7 illustrates a schematic diagram of an electronic device, in accordance with embodiments herein.

FIG. 7 illustrates a simplified block diagram of an electronic device 700 configured to filter images on a screen to prevent individuals other than a user from seeing images on the screen that are in an environment. In one example, the electronic device of FIGS. 1-2. The electronic device 700 includes components such as one or more wireless transceivers 702, one or more processors 704 (e.g., a microprocessor, microcomputer, application-specific integrated circuit, etc.), and one or more local storage medium (also referred to as a memory portion) 706.

Each transceiver 702 can utilize a known wireless technology for communication. The one or more processors 704 format outgoing information and convey the outgoing information to one or more of the wireless transceivers 702 for modulation to communication signals. The wireless transceiver(s) 702 convey the modulated signals to a remote device, such as a cell tower or a remote server (not shown).

The local storage medium 706 can encompass one or more memory devices of any of a variety of forms (e.g., read only memory, random access memory, static random access memory, dynamic random access memory, etc.) and can be used by the one or more processors 704 to store and retrieve data. The data that is stored by the local storage medium 706 can include, but need not be limited to, operating systems, applications, obtained context data, and informational data. Each operating system includes executable code that controls basic functions of the device, such as interaction among the various components, communication with external devices via the wireless transceivers 702, and storage and retrieval of applications and context data to and from the local storage medium 706.

The electronic device 700 in one embodiment also includes a communications interface 708 that is configured to communicate with a network resource. The communications interface 708 can include one or more input devices 709 and one or more output devices 710. The input and output devices 709, 710 may each include a variety of visual, audio, and/or mechanical devices. For example, the input devices 709 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 710 can include a visual output device such as a liquid crystal display screen, one or more status indicators that may be light elements such as light emitting diodes, an audio output device such as a speaker, alarm and/or buzzer, and a mechanical output device such as a vibrating mechanism. The screen may be touch sensitive to various types of touch and gestures. As further examples, the output device(s) 710 may include a non-touch sensitive screen, a text-only screen, a smart phone screen, an audio output (e.g., a speaker or headphone jack), and/or any combination thereof.

In one example, the output device may be a layered screen that includes a lens assembly that is coupled to an actuating device 714. The lens assembly in an example may include plural lenses, including concave lenses, convex lenses, or the like to provide an image on the screen to a convergence focal location that is a determined distance from the screen. At the convergence focal location the image of the screen is in focus to a user, whereas any other location results in a blurred image from the screen. In one embodiment, the actuation device 714 is configured to vary or move the determined distance of the convergence focal location towards or away from the screen. The actuation device may accomplish changing the distance of the convergence focal location distance from the screen by moving a lens of the lens assembly relative to another lens of the lens assembly, or by changing an optical property of at least one lens of the lens assembly such as through electric ionization of the lens.

The electronic device 700 may also include a screen filtering application 716. In one example, the screen filtering application 716 includes instructions to actuate the actuation device 714 to vary the convergence focal location provided by the lens assembly. In this manner, the screen filtering application 716 may function to cause any of the operations as described in relation to the electronic device of FIGS. 1-2. Alternatively, the screen filtering application 716 may also include instructions for a display or screen to provide a convergence focal location at a single viewing area. In yet another example, the filtering application 716 can provide instructions for a display or a screen to provide a convergence focal location within a conical viewing zone. Thus, the screen filtering application 716 can also function to cause any of the operations as described in relation to the electronic device of FIG. 5.

The electronic device 700 also includes sensors 718. The sensors 718 can function to obtain a first type of information and a second type of information related to the user or an environment of interest. The types of information can include visual, auditory, haptic, infrared, or the like. By obtaining information related to the environment of interest, the one or more processors 704 can determine user characteristics, including user identification, user location, user distance from the screen, or the like.

When the user is identified, the screen filtering application 716 may include a profile associated with the user identified. In one example, the screen filtering application 716 includes a lookup table that includes different users of the electronic device. The profile may include settings, including when the screen filtering application 716 functions to filter screen information by providing a convergence focal location so that only the user can see focused information on the display. In one example, a user may not desire to use the screen filtering application 716 at any time. In another example, the user may choose a setting where the screen filtering application 716 includes instructions to determine the location of the electronic device, and any time the electronic device is outside a determined area (e.g. a home or office), the screen filtering application 716 automatically functions to filter the screen information. In such an example, the sensor 718 may function in association with a global navigation satellite system (GNSS) so the filtering application may determine the location of the electronic device.

In another example, the profile may include that the screen filtering application 716 automatically functions to filter the screen or display when the electronic device is at determined location. For example, the user may input different locations such as a library, airport, coffee shop, or the like such that as soon as a determination is made that the electronic device is at such a location, the screen filtering automatically occurs. In yet another embodiment, a condition related to the electronic device may result in the automatic operation of the screen filtering. As an example, when an electronic device is switched into airplane mode, the screen filtering application 716 may automatically begin the screen filtering operation.

In yet another example, the filtering application 716 may include a profile that filters the screen or display when a determined application is in use. For example, when an internet application is launched, the screen filtering application 716 may automatically begin filtering. Alternatively, when a web conferencing application is in use, the screen filtering application 716 may automatically begin filtering. Other applications such as word, PowerPoint, or the like may also be designated in a profile to result in filtering.

In other examples, the user profile may indicate that the screen filtering is always operating for an individual, regardless of location. Alternatively, the screen filtering may be manually placed on or off, allowing a user to determine when to use the filtering application 716. Thus, the user of the electronic device may utilize the profile to make determinations of when additional privacy is desired based on electronic device location, application content, or the like.

Figure 8:
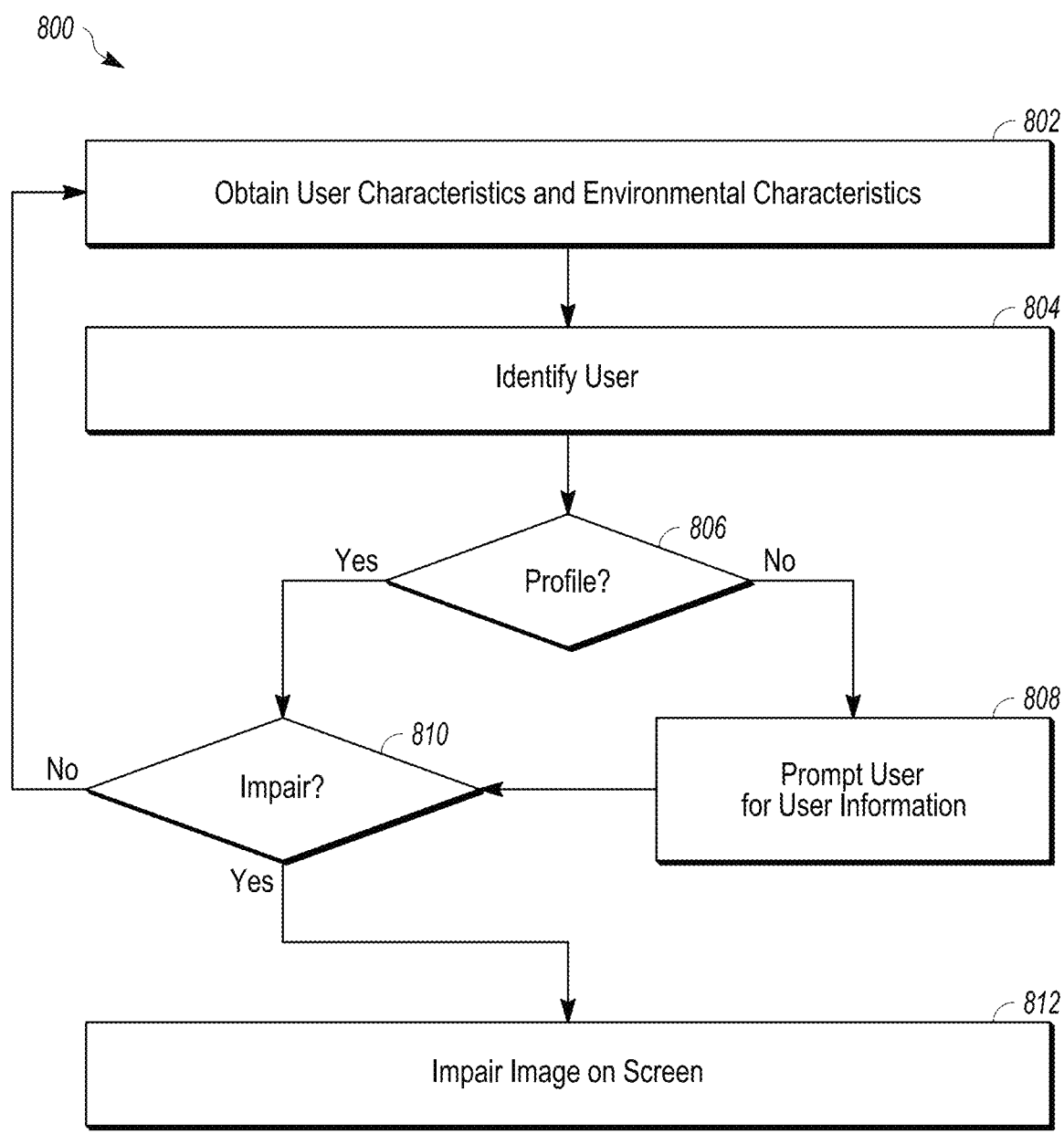
FIG. 8 illustrates a flow block diagram of a process for filtering information on a screen of an electronic device, in accordance with embodiments herein.

FIG. 8 illustrates a flow block diagram of a process 800 for filtering information on a screen or display of an electronic device. In one example the electronic device is the electronic device as described in relation to FIGS. 1 and 2. In another example the electronic device is the electronic device as described in relation to FIG. 5. In an example, the electronic device performs the process based on instructions that may be stored in the memory or storage device of the electronic device.

At 802 one or more processors obtain user characteristics and environmental characteristics in an environment. The one or more processors may obtain the user characteristics or environmental characteristics from a first sensor, have characteristics input into the electronic device or the like. The first sensor may obtain information that can be auditory, visual, haptic, infrared, etc. The environment can be a room, a chair, a classroom, library, a dwelling, a home, an office cubical, an office building, airport, airplane, or the like.

At 804, the one or more processors identify the user based on the user characteristics obtained. In one example the user characteristic may be the login, password, username, or the like input into an electronic device. Alternatively, the identity of the user may be determined via a voice recognition circuitry and/or application, face recognition circuitry and/or application, fingerprint recognition circuitry and/or application, manual input by the user, or the like that utilize user characteristics from voice data, camera data, scanning data, etc. In particular, user characteristics can include voice tone, voice modulation, voice accent, facial features, eye color, fingerprint, and/or any other characteristic that may be utilized to determine the identity of the user.

At 806, the one or more processors determine if the user identified has a profile associated with a screen filtering application. In one example, the user has input information in the profile related to how, when, and/or under what conditions the screen filtering application should vary the output provided on the screen of the electronic device so that only the use may observer a clear or non-blurry image on the screen. To this end, the profile allows the user to select the environments in which the screen filtering application obscures or impairs an image for other individuals in the environment. So, if a user desires screen sharing functionality when using the electronic device for a web conference with a group of other individuals in an environment, in a study room setting where multiple individuals are using the electronic device for a group project, or the like, the screen sharing functionality can be automatically provided. Whereas, if a user desires to obscure or impair the image as a result of being on a train, plane, in a public area, or the like, such environment can also be identified in the profile. If the user identified does not have a profile, then at 808, the one or more processors prompt the user for information to create a profile related to the user. In this manner, the user becomes aware of the privacy capabilities provided by the screen filtering application to implement when using the electronic device.

If at 806, the user identified has a profile, then at 810, the one or more processors access the profile and determine whether the electronic device is in an environment identified in the profile such that observations of the screen should be impaired. In one example the profile indicates that when traveling the screen filtering application is to impair or prevent other individuals in an environment for obtaining an unblurred image from the screen or the display. As a result, the one or more processors utilize environmental characteristics to make a determination of the location or environment of the electronic device. Environmental characteristics can include location data obtained from a GNSS, information obtained from a calendar application regarding a trip, appointment, etc., visual data obtained from a camera of the electronic device showing numerous individuals in an environment, auditory data that includes multiple voices, or determined noises that indicate an environment with individuals other than the user, an input by the user of the location of a device, text in a text message, email, or the like presently being send by the user of the electronic device, a changing of a device into airplane mode, or the like. In each instance the data, information, or other environmental characteristics are obtained by the one or more processors to make a determination that the electronic device is in a location identified by the profile where filtering of an image on a screen or display is desired.

If at 810 a determination is made that no impairment or obscuring of an image is desired in the environment, then on further action is undertaken and the one or more processors continue to determine the environment of the electronic device. However, if at 810 a determination is made that the environment requires impairment or obscuring of an image, then at 812 the one or more processors impair or obscure an image on the screen by providing a convergence focal location for the user of the electronic device to view the image. The convergence focal location is at a determined distance and location from the screen such that moving away from the convergence focal location results in observing an unfocused view of the image on the screen or display. This includes moving backwards, forwards, side-to-side, etc. from the convergence focal location. In one example the convergence focal location is propagated by a lens assembly disposed within a layered screen. In an embodiment where a lens assembly is provided the lens assembly may include an actuating device for moving at least one lens of the lens assembly, or changing at least one optical property of at least one lens of the lens assembly to vary the distance and location of the convergence focal location. To this end, the determined distance may be moved closer to or further away from the user. In one example, a profile may include varying distances and locations of the convergence focal location such that the one or more processors can determine a condition of the user (e.g. sitting at a desk, sitting in an airplane, standing, etc.) and automatically vary the distance and location. In another embodiment, the screen filter application may provide the image such that the convergence focal location is provided at a single viewing area, without actuation or movement of a lens assembly. Regardless of how the convergence focal location is provided, the image observed by any individual not at the convergence focal location is obscured and impaired, providing increased privacy for the user of the electronic device.

As will be appreciated, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable data storage device(s) having computer (device) readable program code embodied thereon.

Any combination of one or more non-signal computer (device) readable mediums may be utilized. The non-signal medium may be a data storage device. The data storage device may be, for example, an electronic, magnetic, optical, electromagnetic, infrared, or semiconductor system, apparatus, or device, or any suitable combination of the foregoing. More specific examples of a data storage device may include a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface and a storage device for storing code may store the program code for carrying out the operations and provide this code through the network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable data storage device, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device, comprising:
a layered screen configured to present an image;
memory to store executable instructions;
one or more processors, when implementing the executable instructions, to:
generate the image at a determined distance and location from the screen at a convergence focal location; and
wherein the image is in focus at the convergence focal location and out of focus at locations other than the convergence focal location.

2. The electronic device of claim 1, wherein the layered screen comprises a lens assembly having a first lens and a second lens that is movable in relation to the first lens to move the convergence focal location with respect to the layered screen.

3. The electronic device of claim 2, further comprising an actuating device configured to move the first lens with respect to the second lens.

4. The electronic device of claim 2, wherein the layered screen further comprises an anti-glare coating, ultra-violet (UV) hard coating, and a protective film.

5. The electronic device of claim 1, wherein the layered screen comprises a lens assembly having a first lens, the electronic device further having an actuating device configured to vary at least one optical property of the first lens.

6. The electronic device of claim 1, wherein the convergence focal location is at a single viewing area.

7. The electronic device of claim 1, wherein the convergence focal location is within a conical viewing zone.

8. The electronic device of claim 1, further comprising:
a sensor coupled to the one or more processors; and
wherein the one or more processors further implement the instructions to:
obtain user characteristics of a user from the sensor;
determine an identification of the user based on the user characteristics; and
generate the image at the determined distance and location from the screen at the convergence focal location based on the identification of the user.

9. The electronic device of claim 1, further comprising:
a sensor coupled to the one or more processors; and
wherein the one or more processors further implement the instructions to:
obtain environmental characteristics in an environment from the sensor;
generate the image at the determined distance and location from the screen at the convergence focal location based on the environmental characteristics.

10. The electronic device of claim 9, wherein the environmental characteristics include at least one of an individual in the environment who in not the user, sounds in the environment, or a location of the environment.

11. The electronic device of claim 1, wherein the electronic device is a laptop computer.

12. A method, comprising:
under control of one or more processors including program instructions to:
project an image through a lens assembly within a layered screen of an electronic device to focus the image at a determined distance and location from the screen at a convergence focal location;
wherein the image projected is out of focus at locations other than the convergence focal location.

13. The method of claim 12, wherein the one or more processors further include instructions to:
obtain user characteristics from at least one sensor;
identify a user of the electronic device based on the user characteristics;
obtain a user profile based on the user identified;
project the image through the lens assembly to focus the image at the determined distance and location from the screen at the convergence focal location based on the user profile.

14. The method of claim 12, wherein the one or more processors further include instructions to:
obtain environmental characteristics from at least one sensor;
project the image through the lens assembly to focus the image at the determined distance and location from the screen at the convergence focal location based on the environmental characteristics.

15. The method of claim 12, wherein the one or more processors further include instructions to:
obtain environmental characteristics from at least one sensor;
determine the location of the electronic device based on the environmental characteristics; and
project the image through the lens assembly to focus the image at the determined distance and location from the screen at the convergence focal location based on the location determined.

16. The method of claim 12, wherein the one or more processors further include instructions to:
obtain user characteristics from at least one sensor;
determine a location of the user with respect to the layered screen based on the user characteristics;
automatically actuate an actuation device to move a first lens of the lens assembly relative to a second lens, or to change an optical property of the first lens, to move the convergence focal location in response to determining the location of the user with respect to the layered screen.

17. A computer program product comprising a non-signal computer readable storage medium comprising computer executable code to automatically:
obtain, with a sensor of an electronic device, user characteristics or environmental characteristics in an environment;
determine whether to impair an image on a screen of the electronic device based on the user characteristics or environmental characteristics;
generate the image at a determined distance and location from the screen at a convergence focal location such that the image is in focus at the convergence focal location and out of focus elsewhere to impair the image on the screen.

18. The computer program product of claim 17, wherein the computer executable code to: actuate an actuation device of the electronic device to vary a location of the convergence focal location.

19. The computer program product of claim 17, wherein to determine whether to impair the image on the screen of the electronic device includes identifying a user based on the user characteristics, and accessing a profile that indicates when or where to impair the image.

20. The computer program product of claim 17, wherein the convergence focal location is one of a) within a conical viewing zone, or b) at a single viewing area.

* * * * *